United States Patent
Edmonds

(10) Patent No.: US 9,292,274 B2
(45) Date of Patent: Mar. 22, 2016

(54) EFFICIENT METHOD AND SYSTEM FOR REDUCING THE TIME TO APPLY UPDATE PACKAGE

(75) Inventor: Paul Edmonds, Palo Alto, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 2622 days.

(21) Appl. No.: 10/931,105

(22) Filed: Aug. 31, 2004

(65) Prior Publication Data

US 2006/0055951 A1    Mar. 16, 2006

(51) Int. Cl.
  *G06F 9/44*    (2006.01)
  *G06F 9/445*    (2006.01)

(52) U.S. Cl.
  CPC ........................................ *G06F 8/65* (2013.01)

(58) Field of Classification Search
  CPC ........................................................ G06F 8/65
  USPC ........... 717/168–178; 711/100, 156, 161, 162
  See application file for complete search history.

(56) References Cited

U.S. PATENT DOCUMENTS

| | | | | |
|---|---|---|---|---|
| 5,386,569 | A * | 1/1995 | Harada et al. | 717/146 |
| 7,089,549 | B2 * | 8/2006 | Venkiteswaran | 717/170 |
| 7,278,140 | B2 * | 10/2007 | Huang et al. | 717/171 |
| 7,886,287 | B1 * | 2/2011 | Davda | 717/168 |
| 2002/0170050 | A1 * | 11/2002 | Fiorella et al. | 717/168 |
| 2004/0088473 | A1 * | 5/2004 | Ogle | 711/100 |
| 2005/0102572 | A1 * | 5/2005 | Oberlaender | 714/29 |
| 2005/0102660 | A1 * | 5/2005 | Chen et al. | 717/168 |
| 2005/0160418 | A1 * | 7/2005 | Jeong et al. | 717/173 |
| 2006/0031664 | A1 * | 2/2006 | Wilson et al. | 713/1 |
| 2007/0028226 | A1 * | 2/2007 | Chen et al. | 717/168 |
| 2007/0079306 | A1 * | 4/2007 | Qumei | 717/168 |

OTHER PUBLICATIONS

Recovery of Jump Table Case Statements from Binary Code, Cifuentes et al., citeseer.com, 1998, pp. 1-11.*

* cited by examiner

*Primary Examiner* — Satish Rampuria
(74) *Attorney, Agent, or Firm* — Smyrski Law Group, A P.C.

(57) ABSTRACT

The present invention reduces the time required to apply an update package for generating a new image from an original image within a non-volatile memory device by effectively reducing the number of flash blocks requiring modification by use of whatever free space is available at the end of the image as required. A set of software development guidelines and an improved firmware development tool chain (i.e. compiler, linker, etc.) are utilized to produce new firmware for the client device. A firmware programmer follows or applies this set of guidelines when developing new features and fixes for distribution via a new firmware image. The improved firmware development tool chain executes on a collection of function blocks, available from the development of the original image, used to create new firmware source code, which when complied and linked yields a new image, prior to the delta or differencing processing.

16 Claims, 2 Drawing Sheets

EFFICIENT METHOD AND SYSTEM FOR REDUCING THE TIME TO APPLY UPDATE PACKAGE

FIELD OF THE INVENTION

The present invention relates generally to the field of computer systems, and more specifically to systems and methods for efficiently updating an image stored in a non-volatile memory device, such as flash memory. In particular, but not exclusively, the present invention pertains to reducing the time required to apply an update package for generating a new image from an original image within a non-volatile memory device by effectively reducing the number of flash blocks requiring modification.

BACKGROUND OF THE INVENTION

Recent years have seen the rapid advancement and proliferation of electronic devices, which devices often require the updating of resident firmware, operating code, and applications or other software loaded thereon, collectively, "binary images", or simply "images". Moreover, installing and updating of such binary images is becoming more routine as advancements applicable to a particular device far outpace the rate at which it is desirable to retire the unit and replace it with an entirely new unit. Instead, the operating software and other applications are updated on the device to create a new binary image needing updating or installation on such device.

Moreover, for many devices for which updating the binary image is desirable, these same devices are continually evolving as new features are developed and deployed. In part, this feature growth is adding to the complexity and size of resident operating systems and applications software stored within the device. This increase in complexity and size typically requires larger update packages to be generated, reflecting the increases in functionality, which results in longer over-the-air transmission times to deliver the update package and longer processing times required to apply a given update package within the device.

Additionally, the processing time required to apply an update package to an original image within a client device is directly proportional to the number of flash blocks that must be reprogrammed.

Today's update package generation technology is problematic because, for example, when a new single byte of code or data is inserted at the start of the image will cause the entire image to move and thus every flash block covered by it will need to be reprogrammed. The use of current difference generators in this example, will produce a very small update package, but due to the number of flash block operation required to move the entire image, will take a long apply time on the client device. No difference engine algorithm, however efficient, can improve on this behavior.

Additionally, in an attempt to mitigate the movement of code and thus reduce the number of flash operations associated with an update package, some manufactures have architected improved technology into their difference generators, wherein this technology is dependent on the client firmware being organized into multiple blocks of code, which inserts a fixed percentage of free space into each existing block of code. If the updates to any given block are less than the fixed percentage of free space inserted per block by the difference generator the resultant update package will not need to relocate code associated with this update. However, this technology is inadequate for large updates because if an update exceeds the fixed percentage of free space inserted per block by the difference generator, the difference package reflects a large number of flash operations to relocate all subsequent blocks of code located after the exceeded region.

Accordingly there is a need for an efficient, effective and reliable system and method for reducing the number of flash blocks modified associated with an update package by use of whatever free space is available at the end of the image as required.

A known manner in reducing the size of a new image update is to use a differencing algorithm or binary differencing generator to compare the current or existing binary image with the new binary image to produce a list of differences. Such differences, in a general sense, are typically output or expressed as sequences or sets of ADD, COPY and MOVE operations such that the new image can be created by re-combining binary strings copied from image sequences resident on the device in the original image and interspersing them with binary sequences from the new image for which a suitable copy string was not available in the old image. Additionally, and update encoder communicating with the binary differencing generator combines additional encoding information to the selected instructions from the binary differencing generator and incorporates other operations derived from additional information to ultimately create the update package. One efficient approach to generating update packages is described in U.S. patent application Ser. No. 10/676,483 entitled "Efficient System and Method for Updating a Memory Device", filed Sep. 30, 2003, the disclosure of which is incorporated herein by reference.

The need therefore is for a method and system that reduces the time required to apply an update package within a client device, and optimizes the number of flash blocks that must be reprogrammed to find the most effective and minimized flash rewrite time for any given original image and new image; resulting in an update package which reflects a minimum of flash block operations in order to effect the new image from the original image by applying the update package.

SUMMARY OF THE INVENTION

The present invention has as an object to be able to add new functionality and features or resolve problems found after deployment of a device, such as a mobile phone, without being recalled by a manufacturer for modification at a service center. The ability for the device to reliably apply the update itself and allowing the update package to be provided via over-the-air delivery, thus removing the costs associated with a major recall, is a further object of the invention.

A typical embodiment of this invention would be for updating of the flash memory image in a mobile phone where the update package has been delivered to the phone over-the-air and is being applied to the flash memory without the subscriber returning the phone to a service center for update. Thus, a further and more specific object of the invention is to generate the smallest update package where the instructions contained within the update package result in the smallest number of required flash operations to apply the update package to the original image within the client device.

The present invention is a set of software development guidelines and an improved firmware development tool chain (i.e. compiler, linker, etc.) to produce new firmware for the client device. A firmware programmer follows or applies this set of guidelines when developing new features and fixes for distribution via a new firmware image. The improved firmware development tool chain executes on a collection of function blocks, available from the development of the original image, used to create new firmware source code, which when complied and linked yields a new image, prior to the delta or differencing processing. The software development guidelines employ five fundamental components to significantly reduce the movement of data within the image and thus potentially reduce update times:

1. Ordering content by placing content that is likely to change only infrequently together at the start of the image where possible;
2. Maintaining the order of the object files specified to the linker at image build time, and when possible adding new object files at the end of the image;
3. Inserting expansion gaps in the image, thus allowing individual sections of the image to grow (or shrink) without moving unrelated content further up the image;
4. Using one or more jump tables for commonly called utility procedures; and
5. Invoking an option available on some compilers that allows procedures to be aligned on specified boundaries.

The firmware development tool chain has three principle tool chain components:

1. A component that accepts a starting address for a collection of function blocks;
2. A component that builds a jump table to entry points in a collection of function blocks for every collection of function blocks in the completed firmware image; and
3. A component that accepts a starting address for every jump table.

Thus it is a further object of the invention to combine these software development techniques with techniques developed to create minimal sized update packages, often know as "delta", "difference", or "diff" packages, such that an update package may be applied by a program in the client device to the resident original image to create a new image.

A further object of the invention is to reduce the associated over-the-air transmission time required to deliver an update package to the client device.

A typical embodiment of this invention would be for any over-the-air difference application using binary differencing techniques (i.e. generator) and update agent to generate and apply an update package to modify an original image to yield a new image will benefit from the achieved reduced flash reprogramming time requirements.

The present invention has as an object to update a binary image held in non-volatile memory on a device such as a mobile phone by application of an update package to upgrade the image in-situ, rather than have to supply a complete copy of the new image. With the update package delivered to the device, the device itself can update the stored image. Accordingly, yet a further object of the invention is a space efficient storage of an update package expressing the difference between an original image and an updated version of that image. These small update packages may feasibly be transmitted over low speed communications links (e.g. a GSM network), and stored on devices with limited available memory (e.g. a mobile phone).

As will be evident through further understanding of the invention, any application using binary differencing techniques to store multiple images by use of an original and update packages (rather than simply the raw images themselves) would potentially benefit from a reduced amount of time required to apply the update package within the client device. This method of generating update packages could be applied to any device using conventional block-structured non-volatile memory such as flash memory; i.e., those with limited processing available to apply an update would benefit by reducing the number of flash blocks modified.

BRIEF DESCRIPTIONS OF THE DRAWINGS

DETAILED DESCRIPTION OF THE INVENTION

Figure 1:
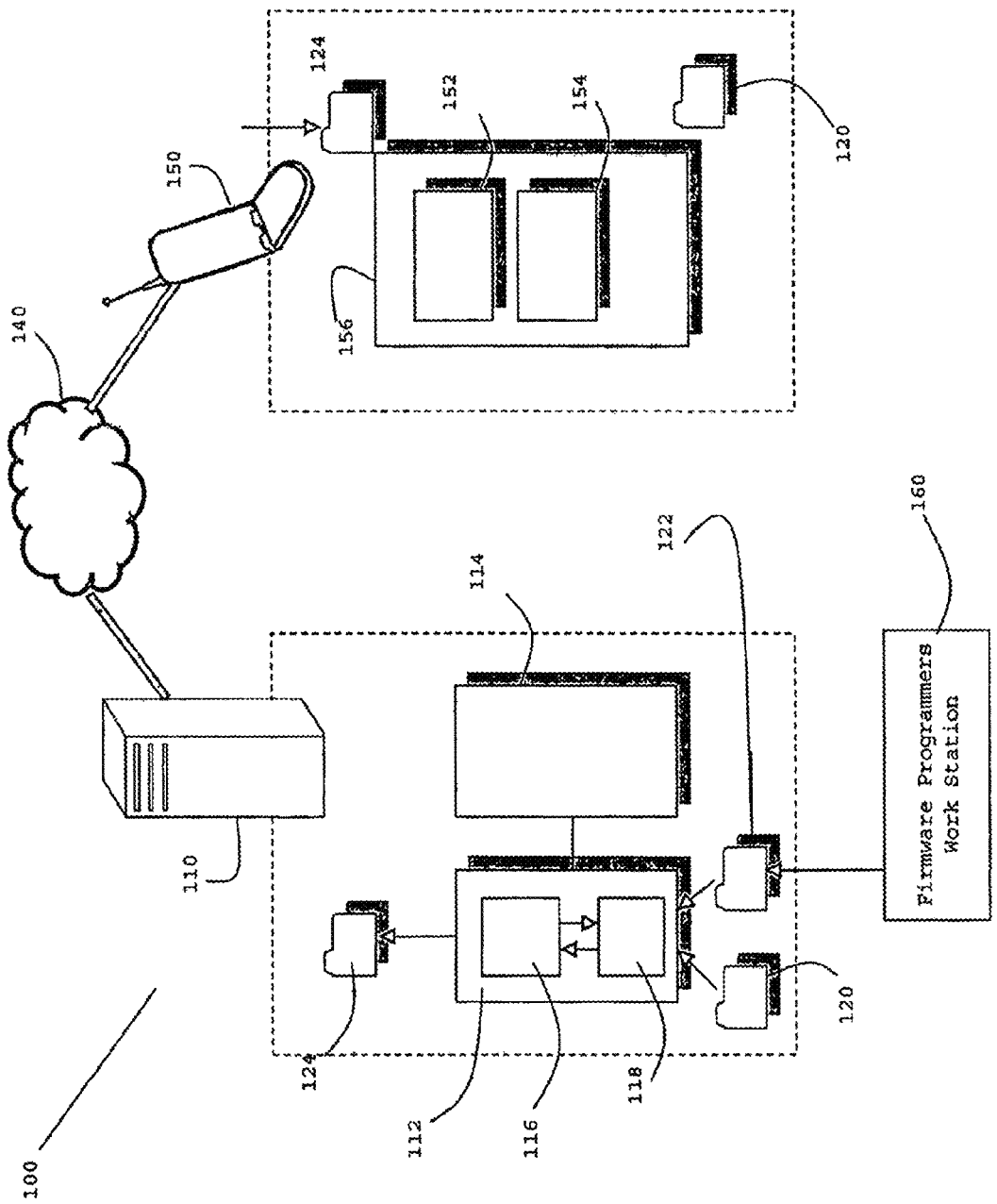
FIG. 1 is a schematic illustration of an updating system of the present invention.

Reference will now be made in detail to the preferred embodiments of the invention, examples of which are illustrated in the accompanying drawings and tables. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

The present invention will be illustrated below in an exemplary wireless communications system utilizing mobile handsets containing flash memory devices; however, the present invention is applicable to any device using a block-structured or partitioned memory device that may need its memory image updated in a reliable way when working in a standalone configuration. Although particularly well suited for use in conjunction with a wireless communications system and for updating handsets used in such a system, the invention is not limited to use with such systems or types of mobile devices. Use of the term "mobile handset" is in no way intended to limit the application of the present invention from use with a much broader class of client devices which may be mobile or fixed, and which may be the form of a telephone handset but may also be of any number of other form factors or varieties of devices. As such, the term "client device" as used herein means the broadest description possible of a class of computing devices that can be connected to a network (whether by fixed, wireless, intermittent, removable connected or other connection) and which the updating techniques detailed herein may be applied, which includes, without limitation, mobile handsets, PDAs, pagers, personal computers, printers and other peripheral devices. Additionally, the term "communications network" or "communications system" as used herein is used in its most expansive sense and applies to any communications system through which an update package or other information may be transferred to and from a client device, whether by static, active, dynamic communications protocols or otherwise, and includes, without limitation, anything from a single client device connected by fixed wire to a host server or computer system, or to a LAN, WAN, wireless communication networks, conventional telephony, the Internet, etc. Accordingly, the disclosed updating techniques may be used in any number or type or combination of communications systems and client devices having block-structured non-volatile memory devices in which it is desirable to reduce the size of the update package, reduce the number of update operations, reduce the time required to apply the update package, or otherwise provide more efficient updating of the binary image stored in the device. As used herein "stored" "saved" "reprogrammed" and similar terms all refer to the same process of storing a binary image in a memory device in accordance with the techniques for storing associated with the particular memory device, whether it be non-volatile flash memory, volatile RAM or otherwise, unless specifically described otherwise.

The present invention will be now be described in relation to a general updating system as illustrated in FIG. 1, showing an over-the-air (OTA) firmware update server and client device involved in the updating of an original or first image residing on the client device. Generally, the present invention introduces a set of software development guidelines and a new firmware tool chain with associated components, wherein these tools and components are installed and available for use by a programmer at their firmware programmer workstation. A programmer may employ these tools and components to generate a new firmware image release that will relocate code in a manner such that the number of flash blocks that must be reprogrammed by the update agent within the client device is minimized. The new firmware tool chain modifies the firmware development data processing path, used to develop a new firmware image release, and is inserted prior to the binary differencing generator and the update encoder within the update generator used to create the new image. Additionally, this tool chain enables a programmer to efficiently apply a set of improved software development guidelines when modifying a collection of function blocks to be used in conjunction with the new firmware source code in creating a new firmware image. The combination of this new firmware tool chain and software development guidelines enable update packages to be realized that minimize the number of flash operations required to apply the update package, and thus reducing the time required to apply an update package within the client device.

FIG. 1 shows an update system 100 in accordance with an illustrative embodiment of the invention. The update system 100 includes an OTA firmware server 110 connected to a client device 150 through a communications network 140. Though shown singularly, client device 150 is representative of any number of devices that may comprise a homogeneous or heterogeneous population of client devices capable of being updated by update system 100. Each such client device 150 contains an original firmware image 120 constituting the software or operating code to be updated, which original firmware image 120 is stored in non-volatile memory (not shown) of client device 150. Client device 150 also contains an update agent 156 that is comprised of download agent 152 for communicating with OTA firmware server 110 and receiving update package 124 though communications network 140. Update agent 156 is further comprised of update decoder 154 that interprets and applies the update instruction set of update package 124 in order to convert original firmware image 120 into a new firmware image 122. Though shown schematically as two separate elements, download agent 152 and update decoder 154 may be parts of the same application or software, be embedded firmware or specialized hardware such as an application specific integrated circuit (ASIC), or may be a sub-component of an application or system software component with additional functionality such as the synchronization and transmission of control parameters or user data between the client device and a control server, which variations and possibilities for implementing the functionalities of download agent 152 and update decoder 154 will be obvious to one skilled in the art.

The OTA firmware server 110 contains, generally, an update generator 112 and update manager 114. While depicted as a single element, OTA firmware server 110 may alternatively be comprised of a server array or set of distributed computing devices that fulfill the purposes of OTA firmware server. Update generator 112 creates update packages 124 through the use of a binary differencing generator 118 and update encoder 116. Update generator 112 maintains, or receives from an external source, an original firmware image 120 corresponding to the subject client device 150 and is also supplied with or obtains a copy of the new firmware image 122 for the subject client device.

A new image 122 is created by a programmer within a firmware programmer workstation 160 prior to being submitted to the binary difference generator 118. The firmware programmer workstation stores and outputs a new firmware image 122. The binary difference generator 118 receives a copy of the original firmware image 120 and a copy of the new firmware image 122 to be applied and, through a process of comparisons, generates lists or sets of ADD, COPY and MOVE operations, which are potential candidate operations usable in generating the update package 124. Update encoder 116 communicates with binary difference generator 118 to combine additional encoding information to select instructions from the binary difference generator and incorporate other operations derived from additional information to ultimately create the update package 124. In the preferred embodiment, the update encoder 116 is highly integrated with the functionality of the binary difference generator 118 so as to enhance optimization and speed of selecting and encoding instructions sets. Update generator 112, consistent with the invention herein disclosed, generates the update package 124, which at the appropriate time or interval is supplied to the client device 150 via the update manager 114 through communications network 140.

Figure 2:
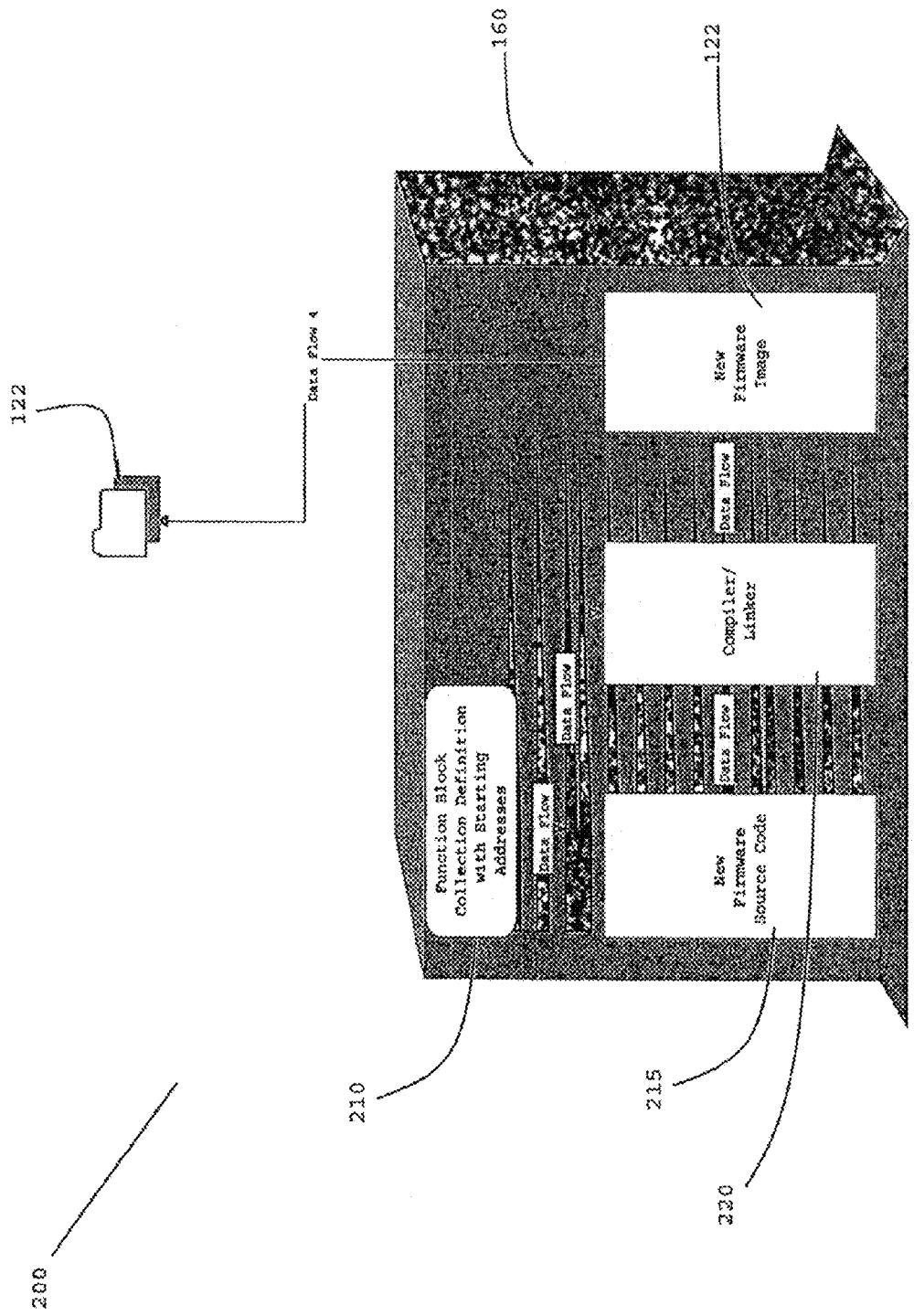
FIG. 2 is a schematic illustration of a firmware programmer development environment of the present invention.

FIG. 2 is a schematic illustration of a firmware programmer development environment 200 for creating a new firmware image 122 in accordance with of the present invention. The process for creating a new firmware image 122 commences at a start state 210 where the function block collection definition is stored, available for use to add new functions and create new features for the client device 150. At this stage in the software development process, the following guidelines relating to content order, object file link order, and expansion gaps may be exercised by a programmer in order to reduce excessive movement of data within a new image being developed and thus potentially reduce the associated update times.

Content ordering is a software guideline that recommends that a programmer may place content that is expected to change only infrequently in future releases together and position this content at the start of the image where possible.

Object file link ordering is a software guideline that recommends that a programmer may maintain the order of the object files specified to the linker at image build time by avoiding unnecessary changes to the order of the object files, and where possible add new object files at the end of the image.

Expansion gaps is a software guideline that recommends that a programmer may insert free space periodically as required within in the image, thus allowing individual sections of the image to grow or shrink without moving unrelated content further up the image. Frequent small gaps are likely to be more beneficial than a few large gaps, although probably more difficult to implement in the build. It should be noted that the boundaries corresponding to the end of such gaps are not fixed; if a section overruns its allotted expansion space in a future firmware revision then the image content can simply be moved as required. The difference generator will always produce a valid update package.

In a further embodiment of the present invention, it may be useful for a programmer to combine one or more of these techniques. For example, if some content exists that is likely to change frequently and must occur early in the image for some reason, first inserting an appropriate expansion gap after this content and then place the infrequently changing content after the inserted expansion gap.

In addition to the above guidelines, the impact on the time to apply an update may be reduced if procedure calls within an image are made via one or more jump tables for commonly called utility procedures. This reduces the knock-on effects resulting from changing the location of a commonly called utility procedure since the callers thereof do not themselves change at the binary level. For example, in the source code this may be achieved via use of 'C' macros that expand each such procedure call into an indirect call via a table. Although potentially a significant amount of effort is required to move to this scheme initially, once in place it is relatively cheap to maintain. The greatest benefit would be obtained by changing frequently called utility procedures to use such a mechanism, though the more procedures that are converted the greater the overall gain.

An further embodiment of the present invention combines the method of expanding each such procedure call into an indirect call via a table with splitting the image into regions (e.g. of 1 MB each), where each region is comprised of a collection of function blocks, with appropriate expansion gaps inserted at the end of each region.

It is essential that a jump table (or tables) of this kind reside at a location where it will not need to be moved in future (e.g. at the start of image) or after the boot code etc. If a large jump table had to be moved in a later revision, even if no other change occurred, the resulting update package might be large. This impact is dependent on how the compiler generates references to the jump table. An appropriate expansion gap should be placed at the beginning of the table to allow for addition of new procedures in future image revisions. If a procedure needs to be removed from the table then the empty slot may be padded with a null entry rather than the entries above being moved down. New procedures may either make use of any such null entries resulting from earlier changes or be added at the end of the table.

A further embodiment of the present invention modifies the software build process to make use of the option available on some compilers (e.g. GNU's Not Unix Compiler Collection or GCC) that allow procedures to be aligned on specified boundaries. This alignment could be set to 8 or 16 bytes for example to add a certain number of small expansion gaps into the image. This scheme does not however remove the need for larger expansion gaps to be placed into the image via another means. The difficulty is two fold: small expansion gaps do not guarantee the existence of a gap after every procedure to accommodate even a trivial change, and once one procedure expands beyond its previous alignment boundary, every procedure above it will also move until a large gap absorbs the expansion.

The compiler/linker 220, as shown in FIG. 2, of the present invention represents this new firmware tool chain, as described above, used to produce a new firmware image 122 for client device 150. This firmware tool chain has a component that accepts a starting address for a collection of function blocks at 210. The firmware tool includes a component that builds a jump table to entry points in a collection of function blocks for every collection of function blocks in the completed new firmware image 122. An additional tool chain component accepts a starting address for every jump table.

A further embodiment of the present invention modifies the software build process to apply the difference package from back to front or visa versa which ever makes for the smallest package and fewest flash operations.

The foregoing descriptions of specific embodiments of the present invention have been presented for the purposes of illustration and description. They are not intended to be exhaustive or to limit the invention to the precise forms disclosed, and should be understood that many modifications and variations are possible in light of the above teaching. The embodiments were chosen and described in order to best explain the principle of the invention and its practical application, to thereby enable others skilled in the art to best utilize the invention and various embodiments with various modifications as are suited to the particular use contemplated. The present invention has been described in a general software update environment. However, the present invention has applications to other software environments requiring over-the-air delivery of an update package resulting from a difference application. Therefore, it is intended that the scope of the invention be defined by the claims appended hereto and their equivalents.

What is claimed is:

1. A method for reducing data movement within an original image by creating a new image using one or more function blocks, comprised of software modules or subroutines, from the original image, said method implemented on a wireless communication device and comprising:
   a. Ordering function blocks by placing software modules or subroutines configured to change relatively infrequently as compared with other software modules or subroutines together at the start of the new image where possible;
   b. Maintaining the order of object files specified to a linker at image build time, and when new object files are required, adding new object files at the end of the new image;
   c. Inserting one or more expansion gaps to reserve free space within the new image to allow individual sections of the image to grow (or shrink) without moving unrelated content further up the new image; and
   d. Positioning a jump table at a location wherein the jump table will not need to be moved, the jump table including an expansion gap at a beginning of the jump table allowing for addition of new procedures in future image revisions.

2. The method of claim 1, further comprising invoking a compiler supported feature that allows procedures to be aligned on specified boundaries whereby this alignment adds free space into the new image by inserting a plurality of expansion gaps.

3. The method of claim 1, further comprising:
   a. Determining differences between an original image and the new image by a binary comparison thereof;
   b. Expressing the differences between the original image and the new image as a set of instructions comprising one or more ADD, COPY and Move operations;
   c. Encoding an update package to include the instruction set comprised of a plurality of ADD, COPY and MOVE operations.

4. The method of claim 3, whereby said update package is decoded and applied to the original image to create the new image.

5. A method for reducing data movement within an original image by creating a new image using one or more function blocks, comprised of software modules or subroutines, from the original image, said method comprising:
   a. Replacing a plurality of commonly called utility procedures with one or more jump tables;
   b. Inserting an expansion gap, to reserve free space within the new image, at the beginning of each jump table; and
   c. Positioning a jump table at a location wherein the jump table will not need to be moved, the jump table including an expansion gap at a beginning of the jump table allowing for addition of new procedures in future image revisions.

6. The method of claim 5, further comprising a splitting of the new image into one or more regions, comprised of a plurality of function blocks, with an expansion gap inserted at the end of each region.

7. The method of claim 5, further comprising an inserting a plurality of null entries within the jump table for each removed procedure.

8. The method of claim 5, further comprising using 'C' macros to expand each called utility procedure into an indirect call via a jump table.

9. A system configured to be employed to create a new image, said system comprising:
   a. A storage device configured to maintain a collection of function blocks with starting addresses;
   b. A software tool chain compiler and linker configured to receive and operate on the collection of function blocks with starting addresses;
   c. A copy of new source code configured to be employed by the software tool chain compiler and linker with the collection of function blocks with starting addresses to produce the new image; and
   d. a tool chain component, whereby said tool chain component builds a jump table positioned at a location wherein the jump table will not need to be moved, the jump table including an expansion gap at a beginning of the jump table allowing for addition of new procedures in future image revisions.

10. The system of claim 9, further comprising a tool chain component, whereby said tool chain component accepts a starting address for a collection of function blocks.

11. The system of claim 9, wherein the new image comprises software modules configured to change relatively infrequently as compared with other software modules together at the start of the new image where possible and new function blocks in the new image are provided at the end of the new image when new function blocks are required.

12. The system of claim 9, further comprising a tool chain component, whereby said tool chain component accepts a starting address for every jump table.

13. An updating system for transforming an original image into a new image, wherein said original image resides within blocks of a block-structured non-volatile memory device contained in a client device, said updating system comprising:
   a. An update generator that produces an update package resulting from a comparison between the original image and the new image whereby said comparison selects and encodes an instruction set comprising a plurality of ADD, COPY and MOVE operations for each of the memory blocks using a jump table positioned at a location wherein the jump table will not need to be moved, the jump table including an expansion gap at a beginning of the jump table allowing for addition of new procedures in future image revisions; and
   b. An update decoder resident on the client device, whereby said update decoder interprets the instruction set of the update package and applies the update a package to update the memory blocks.

14. The system of claim 13 further comprising a communications network and a host server that comprises the update generator, whereby the update package is delivered from the host server to the client device via the communications network.

15. The system of claim 13 wherein said update decoder applies the update package either from back to front or front to back minimizing the resulting flash operations.

16. The system of claim 13, wherein the new image comprises software modules configured to change relatively infrequently as compared with other software modules positioned together at the start of the new image where possible, and when required, one or more new function blocks are provided at the end of the new image.

\* \* \* \* \*